Patented Feb. 29, 1944

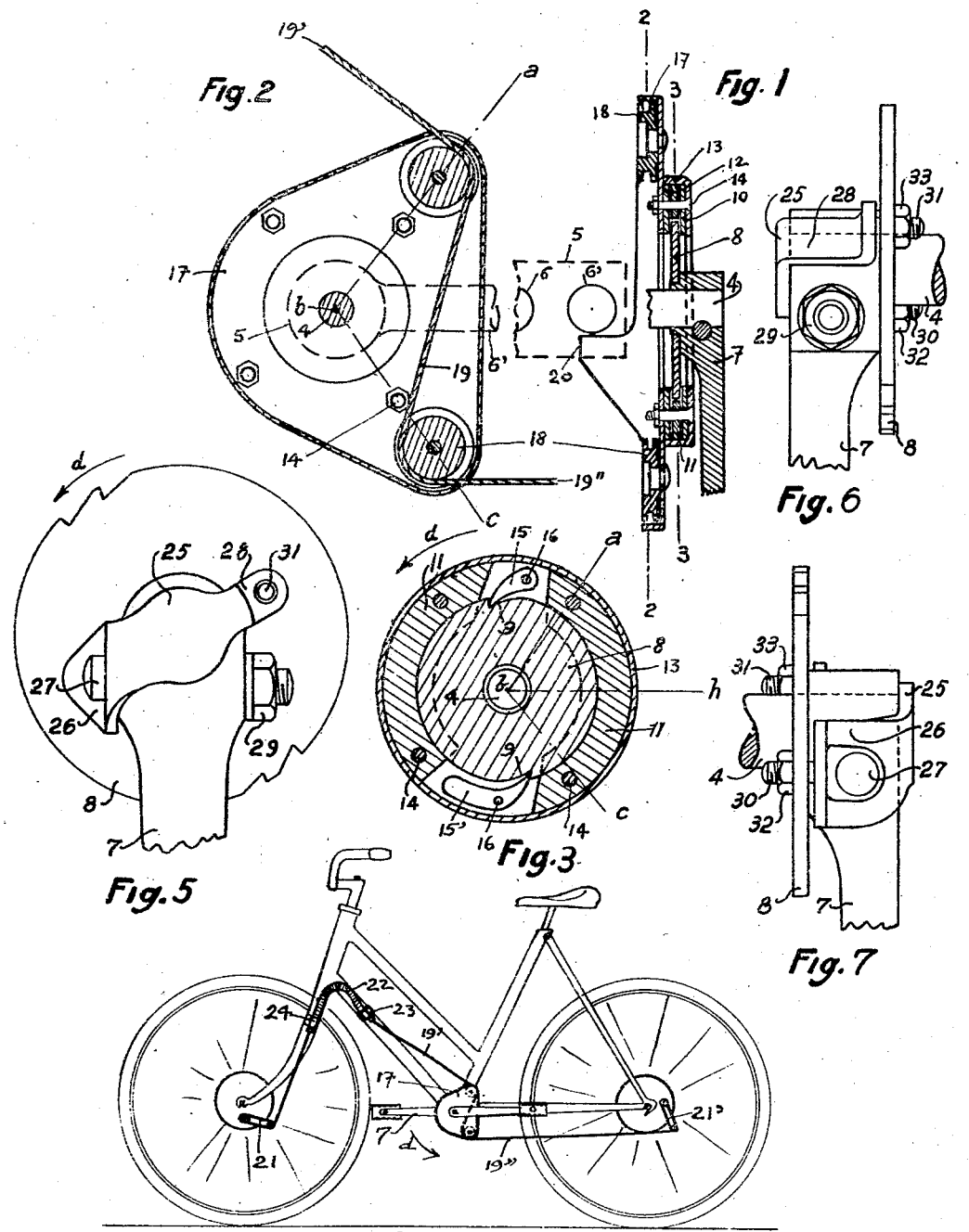

2,342,795

UNITED STATES PATENT OFFICE 2,342,795

BALANCED CONTROL FOR CYCLE BRAKES

Marcel Paul Durand, Saint-Germain-en-Laye, France; vested in the Alien Property Custodian Application February 17, 1942, Serial No. 431,207
In France October 17, 1940

3 Claims. (Cl. 192—5)

The object of the present invention is a control system for cycle brakes actuated by back-pedalling, which operates simultaneously on both wheels of the cycle in a balanced manner, that is to say by distributing the power applied by back-pedalling according to a predetermined proportion between the two brakes.

The essential feature of the apparatus which forms the subject matter of the invention is a casing, provided with pawls, mounted on one of the cranks of the cycle and carrying two pulleys offset in such a way as to accommodate a cable arranged in the form of an S, which clears the crank-axle, the lower strand of which cable is led towards the rear brake, below the rear fork, and the upper strand of which is led towards the front brake, both of said strands emerging tangentially from the pulleys on which the cable runs freely for the purpose of distributing the braking effect between the two brakes.

It should be noted that the fitting of said coupled and balanced brake control in nowise excludes the possibility of connecting up the same brakes to individual controls—hand operated for instance—so as to constitute emergency controls.

The accompanying drawing represents a preferred embodiment of the invention merely as an example thereof and without in any way limiting its scope thereto.

Fig. 1 is a sectional view, through a—b—c of Figs. 2 and 3 which are respectively cross sections through 2—2 and 3—3 of Fig. 1, of the apparatus mounted on a crank. Fig. 4 is a view showing the mounting of the apparatus on a cycle fitted with drum brakes on the hubs. Fig. 5 is a face view of a method of clamping the apparatus onto the crank of the cycle, Figs. 6 and 7 are views folded back on either side, according to Fig. 5.

In said figures, similar digits refer to similar units. 4 is the crank-axle, 5 the crank-axle housing, 6 and 6' are the tubes of the lower rear fork, 7 the crank positioned on the side opposite to the chain and consequently bearing no sprocket-wheel. A disc 8 provided with two notches 9 is rendered solid with crank 7 by any suitable means. Said disk can rotate freely in direction d (Fig. 3) in friction linings 10—11—12 which surround it and hold it laterally, said linings being themselves retained within housing 13 by bolts 14. Pawls 15—15' which rotate freely about spindles 16, solid with 13, are positioned between said friction linings. Bolts 14 also retain plate 17 which closes casing 13 and supports the two pulleys 18 on which cable 19 can run, and is provided with a lug 20 which can be checked under 6' to prevent the rotation of casing 13 and of plate 17 in direction d.

Pawls 15—15' are contrived so as to drop into notches 9 when crank 7 is in a substantially horizontal position h (Fig. 3).

It will be readily understood that when crank 7 rotates in direction d, the slight friction of 8 against 10—11—12 will have a tendency to draw assembly 13—17 in the same direction, but that said assembly will be arrested in the position shown owing to the fact that 20 is checked under 6', crank 7 continuing to rotate.

On the contrary, in the direction opposite to d (back-pedalling), when crank 7 reaches a substantially horizontal position, pawls 15—15' engage with notches 9 which drive them along, as well as assembly 13—17 in a direction opposite to d which sets up traction on the two ends 19' and 19" of cable 19 and consequently actuates the front and rear brakes 21 and 21' which are respectively connected to 19' and 19", said braking action ceasing as soon as the user pedals in direction d. In order that the action of 19' on 21 may not be influenced by the swivelling movements of the steering assembly, cable 19' is guided by a flexible sheath 22 clamped on the one hand to the frame at point 23 and to the fork at point 24.

It will be readily understood that the braking power can be apportioned to brakes 21 and 21' in accordance with the desired proportions by simply causing a variation in the respective lengths of their operative levers.

Figs. 5 to 7 represent a method of clamping notched disk 8 onto crank 7 of the cycle (and also of ensuring the driving of the disk) by means of a bridge-shaped part straddling the big end of the crank, one branch of said bridge-shaped part being hollowed out to allow the insertion of the key-bolt and the other branch being off set to leave a clear space for the key-bolt nut on the big end of the crank; the centering of the disk and of the crank being ensured by the crank-axle and the clamping of the bridge-shaped part being obtained by means of two nuts bearing against the face of the disk on the side opposite to the crank.

This procures a rapid method of clamping suitable for application to any kind of crank without necessitating any special machining of said cranks and moreover ensuring the positive drive of the disk.

In Figs. 5 to 7, 25 is the bridge-shaped part straddling the crank big end 7. Branch 26 of the bridge-shaped part is provided with a hollowed out recess allowing key-bolt 27 to pass through freely, while the other branch 28 is off set to allow nut 29 of the key-bolt 27 to bear directly against the big end of crank 7 and to permit of its being readily tightened up by means of an ordinary open-ended wrench.

Branches 26 and 28 of bridge-shaped part 25 are respectively provided with screw-threaded stud-bolts 30 and 31 which traverse notched disk 8, and nuts 32 and 33 of which make it possible to apply notched disk 8 firmly against the big end of crank 7, while said parts are centered to one another by means of crank-axle 4.

It will be readily understood that the power applied to crank 7 is transmitted to notched disk 8 in the back-pedalling direction (the direction reverse to direction *d*) through branch 26 and stud-bolt 30 whereas, in the pedalling direction there is no appreciable power to be transmitted and the clamping of 7 against 8 is sufficient to ensure the drive.

Obviously the form of embodiment hereinabove described and illustrated is given merely as an example and may vary in a great measure without departing from the spirit and scope of the invention.

What I claim is:

1. In a brake control for a cycle having a frame, a pedal crank with a shaft journaled in said frame, a unidirectional clutch including a disc connected with said crank for common rotation, a member oscillatable about the crank axis, and detent means operative to couple said disc and said member when said crank is backed, two pulleys pivoted on said member eccentrically with respect to said axis and a brake-actuating cable passed in S-shape about said pulleys, that invention which consists in that said member is formed with a ring portion of channel-shaped cross-section frictionally engaged by said disc, said member including a projection so arranged as to abut against a portion of said frame and to prevent said member from being taken along by said disc when said crank is turned in a forward direction, and said detent means consisting of at least one pawl pivoted in said channel of said member so as to slide on the periphery of said disc and to engage in a sawtooth-like recess in the latter when the crank is backed.

2. A device as claimed in claim 1 wherein the connection of said crank and its shaft includes a key bolt passed through the crank head and the shaft, and a nut on the one end of the key bolt, further comprising a bridge part having a central portion covering said crank head, and two end portions, one of which being provided with a hole through which said key bolt can be inserted, said other end portion being set off to provide a clear space for said nut, and screw bolts in engagement with said end portions and said disc to clamp the latter to said crank.

3. A device as claimed in claim 1 wherein said pawl and said recess are in registry for engagement when said crank is in substantially horizontal position.

MARCEL PAUL DURAND.